(12) United States Patent  
Ray

(10) Patent No.: US 9,612,416 B2
(45) Date of Patent: Apr. 4, 2017

(54) FIBER DEMARCATION BOX FOR LAYERING AND STORING COILED FIBER OPTIC CABLING

(71) Applicant: All Systems Broadband, Inc., Livermore, CA (US)

(72) Inventor: Craig Dwayne Ray, Fuquay-Varina, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 14/587,528

(22) Filed: Dec. 31, 2014

(65) Prior Publication Data

US 2016/0187603 A1 Jun. 30, 2016

(51) Int. Cl.
*G02B 6/44* (2006.01)

(52) U.S. Cl.
CPC .......... *G02B 6/4447* (2013.01); *G02B 6/4455* (2013.01)

(58) Field of Classification Search
None
See application file for complete search history.

(56) References Cited

U.S. PATENT DOCUMENTS

| | | | | |
|---|---|---|---|---|
| 5,668,911 A | * | 9/1997 | Debortoli | G02B 6/4446 385/135 |
| 5,790,741 A | * | 8/1998 | Vincent | G02B 6/4446 385/135 |
| 6,167,178 A | * | 12/2000 | Nave | G02B 6/4436 385/100 |
| 6,249,633 B1 | | 6/2001 | Wittmeier, II et al. | |
| 6,621,975 B2 | | 9/2003 | Laporte et al. | |
| 6,661,961 B1 | * | 12/2003 | Allen | G02B 6/445 385/135 |
| 7,469,088 B2 | * | 12/2008 | Nothofer | G02B 6/4432 385/110 |
| 7,493,003 B2 | * | 2/2009 | Kowalczyk | G02B 6/4452 385/135 |
| 7,496,269 B1 | * | 2/2009 | Lee | G02B 6/4452 385/134 |
| 7,613,376 B2 | * | 11/2009 | Wright | G02B 6/4478 385/134 |
| 7,751,675 B2 | * | 7/2010 | Holmberg | G02B 6/4446 385/134 |
| 8,208,781 B1 | | 6/2012 | Morgan et al. | |
| 8,428,419 B2 | | 4/2013 | LeBlanc et al. | |
| 8,929,708 B2 | * | 1/2015 | Pimentel | G02B 6/4441 385/135 |

(Continued)

*Primary Examiner* — Andrew Jordan
(74) *Attorney, Agent, or Firm* — Murphy, Bilak & Homiller, PLLC

(57) ABSTRACT

A fiber demarcation box includes a rear panel extending along a plane in height and width directions that are perpendicular to one another. Outer sidewalls extend away from a perimeter of the rear panel in a depth direction that is perpendicular to the height and width directions. A bulkhead that adjoins the rear panel and the outer sidewalls 104 extends between opposite facing ones of the outer sidewalls in the height direction so as to divide the fiber demarcation box into first and second interior volumes. A cable plane divider in the first interior volume adjacent to the bulkhead includes a first planar section that extends away from the bulkhead in the width direction and is spaced apart from the rear panel in the depth direction.

20 Claims, 8 Drawing Sheets

(56) References Cited

U.S. PATENT DOCUMENTS

| | | | |
|---|---|---|---|
| 2008/0056652 A1* | 3/2008 | Nothofer | G02B 6/4432 385/113 |
| 2009/0060440 A1* | 3/2009 | Wright | G02B 6/4478 385/135 |
| 2012/0219262 A1 | 8/2012 | Hendrix et al. | |
| 2012/0328257 A1 | 12/2012 | Kowalczyk et al. | |
| 2012/0328258 A1* | 12/2012 | Barron | G02B 6/4454 385/135 |
| 2013/0183017 A1 | 7/2013 | de los Santos Campos et al. | |
| 2013/0243386 A1* | 9/2013 | Pimentel | G02B 6/4441 385/135 |
| 2014/0259611 A1* | 9/2014 | Ray | G02B 6/4454 29/428 |
| 2014/0348480 A1* | 11/2014 | Giraud | G02B 6/4454 385/135 |
| 2016/0187603 A1* | 6/2016 | Ray | G02B 6/4447 385/135 |

* cited by examiner

FIBER DEMARCATION BOX FOR LAYERING AND STORING COILED FIBER OPTIC CABLING

TECHNICAL FIELD

The present invention generally relates to optical communications equipment, and particularly relates to fiber demarcation boxes that are used for the storage of fiber optic cables.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

Fiber demarcation boxes are used in fiber optic networks to secure and store spliced fiber optic cabling. For example, a splice between service provider cabling and customer cabling can be stored in a fiber demarcation box. The service provider cabling is routed into the fiber demarcation box such that a rugged exterior cable jacket is stripped to expose loose-buffer-tubes from the cable jacket. Each of the loose-buffer-tubes contains one or more optical fibers that can be spliced with customer cabling. For instance, the loose-buffer-tubes may be spliced with so-called "pigtail" cables. A pigtail cable includes a standardized end connector at one and exposed fiber at the other end.

When storing a splice of fiber optic cabling in a fiber demarcation box, it is important to minimize the potential damage to the cabling. In many cases, if the fiber optic cabling is not mechanically protected, it is susceptible to damage, which can potentially disrupt the fiber optic connection. For example, pigtail cabling typically has a relatively small diameter (e.g., 900 nm or less) with a relatively thin layer of encapsulant material protecting the optical fiber. This pigtail cabling may be referred to as a tight-buffer fiber optic cabling because the encapsulant material is formed directly on the optical fibers. By contrast, the protective structure of loose-buffer-tube fiber optic cabling is decoupled from the individual optical fibers. Furthermore, the protective structure of loose-buffer-tube fiber optic cabling is typically much thicker and stiffer than pigtail cabling. Thus, the loose buffer tube cabling has the potential to damage the pigtail cabling, e.g., by friction or acute mechanical pressure.

The need to minimize potential damage to the cabling can be in conflict with the need to splice and store greater volumes of fiber optic cables in smaller areas. The number and volume of the fiber optic cables utilized in modern fiber optic networks continues to grow in response to the need for increased bandwidth. In some instances, the network is built out such that there is little or no room to provide larger fiber demarcation boxes. Thus, there is a need to provide a fiber demarcation box with increased space efficiency without compromising the potential of damage to the cabling stored within the fiber demarcation box.

SUMMARY

An assembly for storing a plurality of spliced fiber optic cables is disclosed. According to an embodiment, the assembly includes a fiber demarcation box. The fiber demarcation box includes a rear panel and outer sidewalls extending away from a perimeter of the rear panel in a depth direction of the fiber demarcation box, the depth direction being perpendicular to the rear panel. A bulkhead extends between opposite facing ones of the outer sidewalls and away from the rear panel in the depth direction so as to divide the fiber demarcation box into first and second interior volumes. A cable plane divider is arranged in the first interior volume adjacent to the bulkhead and includes a first planar section extending away from the bulkhead in a direction parallel to the rear panel. A plurality of pigtail cable receptacles is arranged in the bulkhead such that the first planar section of the cable plane divider is between the pigtail cable receptacles and the rear panel in the depth direction. Each of the pigtail cable receptacles are dimensioned to receive an end connector of a fiber optic cable. A coil of loose-buffer-tube fiber optic cables in the first interior volume is constrained between the rear panel and the first planar section of the cable plane divider. A plurality of tight-buffer fiber optic cables in the first interior volume is positioned above the coil of loose-buffer-tube fiber optic cables with respect to the rear panel, and has end connectors coupled to the pigtail cable receptacles. The cable plane divider separates the tight-buffer fiber optic cables from the coil of loose-buffer-tube fiber optic cables in the depth direction.

A fiber demarcation box for storing a plurality of spliced fiber optic cables is disclosed. According to an embodiment, the fiber demarcation box includes a rear panel extending along a plane in a height and width direction of the fiber demarcation box, the height and width directions being perpendicular to one another. Outer sidewalls extend away from a perimeter of the rear panel in a depth direction of the fiber demarcation box, the depth direction being perpendicular to the height and width directions. A bulkhead adjoins the rear panel and the outer sidewalls and extends between opposite facing ones of the outer sidewalls in the height direction so as to divide the fiber demarcation box into first and second interior volumes. A cable plane divider in the first interior section is adjacent to the bulkhead and includes a first planar section that extends away from the bulkhead in the width direction and is spaced apart from the rear panel in the depth direction.

A method of storing a plurality of spliced fiber optic cables in a fiber demarcation box is disclosed. According to an embodiment, the method includes providing a fiber demarcation box. The fiber demarcation box includes a rear panel, outer sidewalls extending away from a perimeter of the rear panel, a bulkhead extending between opposite facing ones of the outer sidewalls, and a cable plane divider in the first interior volume adjacent to the bulkhead, and a cable plane divider in the first interior section adjacent to the bulkhead. The cable plane divider includes a first planar section extending away from the bulkhead in a direction parallel to the rear panel. The method further includes providing a plurality of pigtail cable receptacles in the bulkhead such that the first planar section of the cable plane divider is between the pigtail cable receptacles and the rear panel in the depth direction. Each of the pigtail cable receptacles is dimensioned to receive an end connector of a fiber optic cable. The method further includes splicing a plurality of loose-buffer-tube fiber optic cables with a plurality of tight-buffer fiber optic cables having end connectors, coiling the loose-buffer tube fiber optic cables, and arranging the coil of loose-buffer tube fiber optic cables in the first interior volume between the first planar section of the cable plane divider and the rear panel. The method further includes inserting the end connectors of the tight-buffer fiber optic cables into the pigtail cable receptacles such that the tight-buffer fiber optic cables are positioned above the coil of loose-buffer-tube fiber optic cables with respect to the rear panel, and such that the end connectors of the tight-buffer fiber optic cables are coupled to the pigtail cable receptacles. The loose-buffer tube fiber optic cables and the tight-buffer fiber optic cables are arranged such that the cable plane divider separates the tight-buffer fiber optic cables from the coil of loose-buffer-tube fiber optic cables in the depth direction.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1, which includes

FIG. 2, which includes

DETAILED DESCRIPTION

Figure 1A:
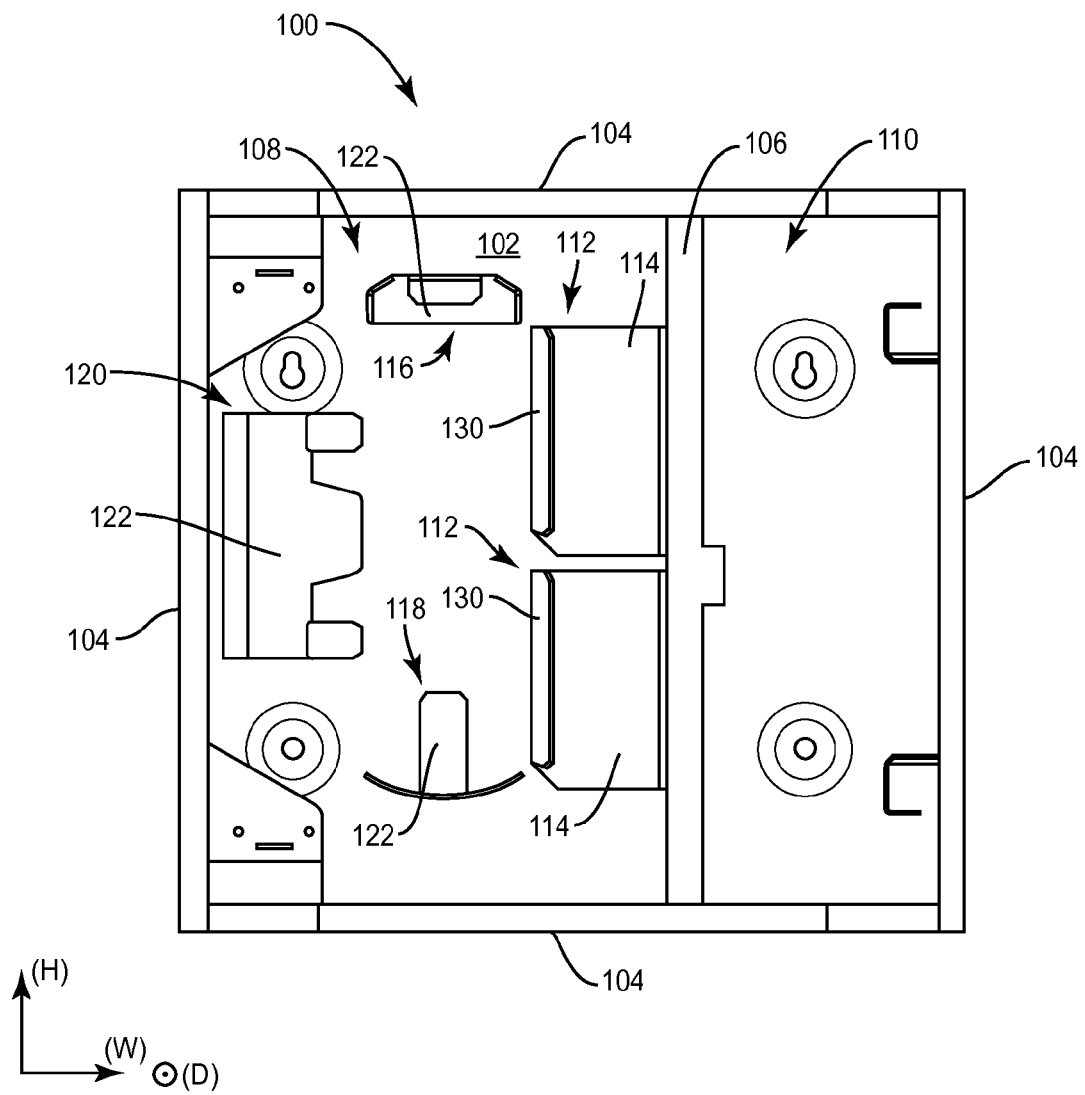
FIGS. 1A and 1B, depicts a fiber demarcation box from front-view and diagonal-view perspectives, respectively, according to an embodiment.

Embodiments described herein provide a fiber demarcation box 100. The fiber demarcation box 100 includes a rear panel 102, outer sidewalls 104 extending away from a perimeter of the rear panel 102, and a bulkhead 106 extending between opposite facing ones of the outer sidewalls 104. The bulkhead 106 divides the fiber demarcation box 100 into first and second interior volumes 108, 110. A cable plane divider 112 is arranged in the fiber demarcation box 100 adjacent to the bulkhead 106. The cable plane divider 112 includes a first planar section 114 that is spaced apart from the rear panel 102 in a depth direction of the fiber demarcation box 100. A plurality of cable retainers 116, 118, 120 may also be arranged in the first interior volume 108. The cable retainers 116, 118, 120 include third planar sections 122 that are spaced apart from the rear panel 102.

Advantageously, the cable plane divider 112 in conjunction with the cable retainers 116, 118, 120 provide a space to store a coiled length of loose-buffer-tube fiber optic cables and secure this coil within a defined portion of the first interior volume 108 such that the coil is flush against the rear panel 102. Further, pigtail cabling can be terminated at the bulkhead and layered above the loose-buffer-tube fiber optic in the depth direction of the fiber demarcation box 100. The first planar section 114 of the cable plane divider 112 prevents the two types of cabling from contacting one another, thereby protecting the termination of the pigtail cabling. The pigtail cabling can be coiled around the cable retainers 116, 118, 120 on opposite faces as the coil of loose-buffer-tube fiber optic cables. Thus, the loose-buffer-tube fiber optic cables and the pigtail cables can be layered above and/or alongside one another, with the features of the fiber demarcation box 100 preventing these two different types of cables from damaging one another.

Figure 1B:
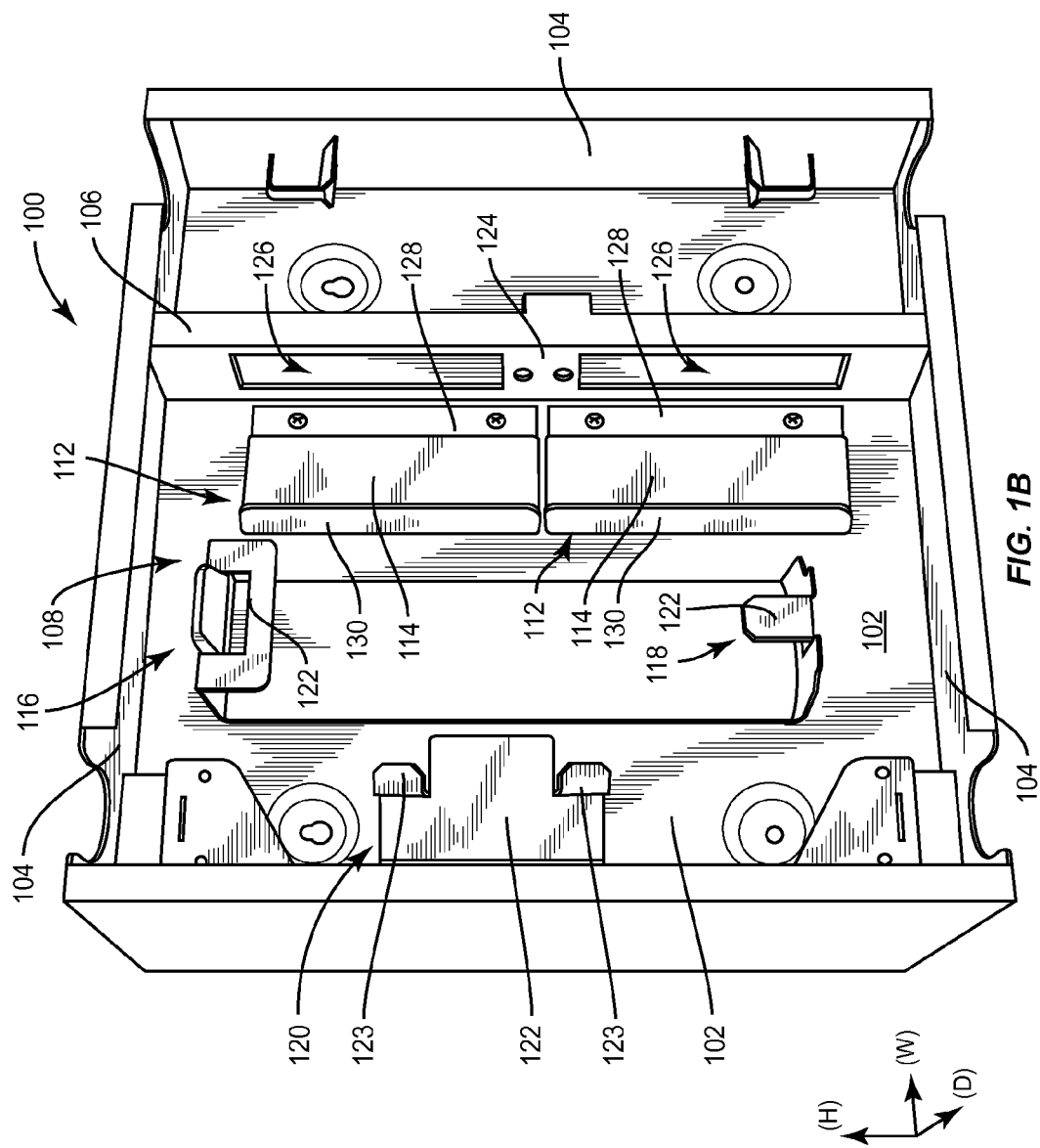

FIG. 1 illustrates a fiber demarcation box 100 for storing a plurality of spliced fiber optic cables, according to an embodiment. FIG. 1A illustrates the fiber demarcation box 100 from a front-view perspective and FIG. 1B illustrates the fiber demarcation box 100 from a diagonal-view perspective. The fiber demarcation box 100 includes a rear panel 102 that is opposite from a door (not shown) that defines a front of the box 100. The rear panel 102 may be a substantially planar surface extending along a plane can be defined with reference to height (H) and width (W) direction of the fiber demarcation box 100. The height (H) and width (W) directions are parallel to the rear panel 102 and perpendicular to one another.

The rear panel 102 may be configured as a rectangle, for example. According to an embodiment, the rectangle has two longer sides and two shorter sides. In this case, the height (H) direction may be parallel to the two longer sides. However, the height (H) direction does not necessarily correlate to longer sides of the fiber demarcation box 100, and always extends in the direction shown in FIG. 1. Other two-dimensional rear panel 102 geometries are possible, such as a square, polygon, etc. Furthermore, the perimeter of the rear panel 102 may include one or more curves.

The fiber demarcation box 100 further includes outer sidewalls 104 that extend away from the perimeter of the rear panel 102 in a depth (D) direction of the fiber demarcation box 100. The depth (D) direction is perpendicular to the plane formed by the rear panel 102. That is, the depth (D) direction is perpendicular to the height (H) and width (W) directions. Thus, the rear panel 102 and the outer sidewalls 104 collectively define a three-dimensional interior space of the fiber demarcation box 100 that is used to store fiber optic cabling. In other words, the first and second interior volumes represent components of the overall volume of the fiber demarcation box 100 that is defined by the rear panel 102 and the outer sidewalls 104. According to an embodiment, the outer sidewalls 104 are perpendicular to the rear panel 102. Alternatively, the outer sidewalls 104 may be arranged at an oblique angle with respect to the rear panel 102.

The fiber demarcation box 100 further includes a bulkhead 106 extending between opposite facing ones of the outer sidewalls 104 in the height (H) direction. The bulkhead 106 includes a planar dividing wall 124 adjoining and extending away from the rear panel 102 in the depth (D) direction. The bulkhead 106 divides the fiber demarcation box 100 into first and second interior volumes 108, 110. According to an embodiment, the dividing wall 124 of the bulkhead 106 is perpendicular to the rear panel 102. Alternatively, the dividing wall 124 may be may be arranged at an oblique angle with respect to the rear panel 102.

The fiber demarcation box 100 is configured such that a plurality of fiber optic cable receptacles may be arranged in the bulkhead 106. According to an embodiment, the bulkhead 106 includes one or more openings 126 in the dividing wall 124 that are dimensioned to receive modular structures containing one or more fiber optic cable receptacles. That is, the openings 126 may have a rectangular shape, for example, that is sufficiently large to accommodate one or more discrete components. These discrete components include individual fiber optic connectors, such as LC, SC or FC connectors, for example. Alternatively, the dividing wall 124 may include openings 126 that are dimensioned such that an end connector of a fiber optic cable can be directly inserted into the bulkhead 106 in an interlocking manner. In this configuration, the fiber optic connectors are integrated into the bulkhead 106.

Figure 2A:
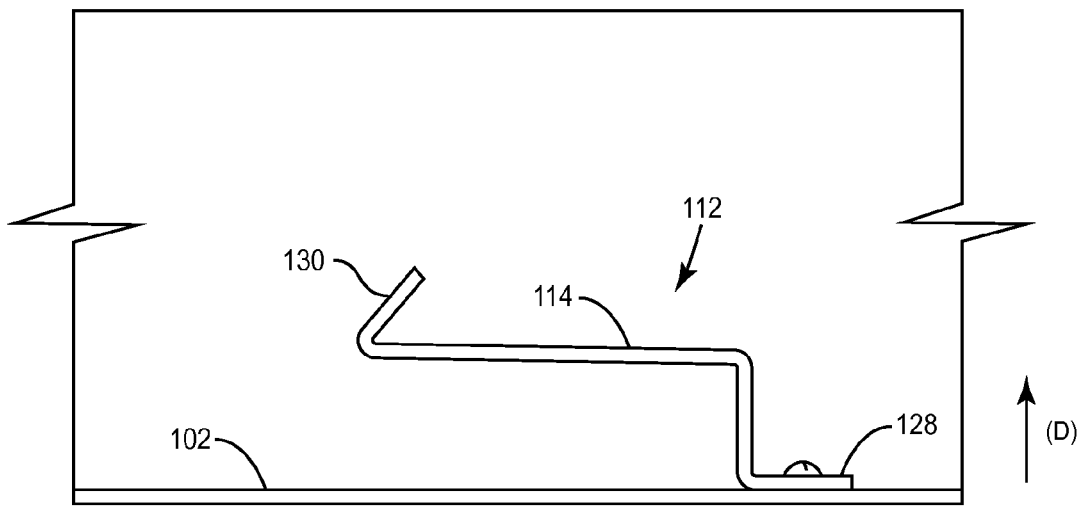
FIG. 2A and 2B, depicts a side-profile view of a cable retainer and a cable plane divider, respectively, according to an embodiment.

The fiber demarcation box 100 further includes a cable plane divider 112 in the first interior volume 108 adjacent to the bulkhead 106. An exemplary side-profile view of the cable plane divider 112 is shown in FIG. 2A. The cable plane divider 112 includes a first planar section 114 that extends away from the bulkhead 106 in a direction that is parallel to the rear panel 102 (e.g., in the width (W) direction). The first planar section 114 is spaced apart from the rear panel 102 in the depth (D) direction. Thus, there is a gap between the first planar section 114 and the rear panel 102 in the depth (D) direction. This gap is sufficiently large such that fiber optic cabling can be placed between the first planar section 114 and the rear panel 102. The first planar section 114 may be parallel to the rear panel 102. Alternatively, the first planar section 114 may extend along at an incline in the width (W) direction relative to the plane of the rear panel 102 such that a separation distance between the first planar section 114 and the rear panel 102 increases with increasing distance from the bulkhead 106.

The cable plane divider 112 is affixed to the bulkhead 106 or to the rear panel 102 in close proximity to the bulkhead 106. The connection between the cable plane divider 112 and the fiber demarcation box 100 is provided by a base section 128 of the cable plane divider 112, which forms an angled connection with the first planar section 114, and extends along a different plane as the first planar section 114.

As depicted in FIG. 1, the fiber demarcation box 100 includes two of the cable plane dividers 112 arranged adjacent to one another in the height (H) direction. There is a small gap between these two cable plane dividers 112 in the height (H) direction. Alternatively, the fiber demarcation box 100 may include a single cable plane divider 112 without a gap in the middle. For example, a cable plane divider 112 that occupies most or all of the height of the two cable plane dividers 112 depicted in FIG. 1 may be provided as an alternate configuration.

According to an embodiment, the cable plane divider 112 includes a second planar section 130 forming an angled connection with the first planar section 114. The second planar section 130 adjoins the first planar section 114 at an end of the first planar section 114 that is opposite the bulkhead 106. According to an embodiment, the second planar section 130 extends towards the bulkhead 106 in the width (W) direction. For example, if the first planar section 114 is parallel to the rear panel 102 in the width (W) direction, an angle between the first and second planar section 130 that faces the bulkhead 106 may be less than ninety degrees. Thus, in this embodiment, the first and second planar sections 114, 130 of the cable plane divider 112 overlap with one other in the width (W) direction. As shown in FIG. 2, there may be a gap between the second planar section 130 and the bulkhead 106 in the width (W) direction.

According to an embodiment, the fiber demarcation box 100 includes a plurality (i.e., two or more) of cable retainers 116, 118 and 120 arranged in the first interior volume 108. The cable retainers 116, 118 and 120 may be arranged in a polygon, such as a triangle, rectangle, pentagon, etc., in the plane of the rear panel 102. This polygon is defined with reference to a center point of the cable retainers 116, 118 and 120. For example, the plurality depicted in FIG. 1 includes first, second and third cable retainers 116, 118 and 120 that form a triangle in the plane of the rear panel 102.

The first and second cable retainers 116, 118 are spaced apart from one another in the height (H) direction. For example, the first and second cable retainers 116, 118 may be provided near the top and bottom of the fiber demarcation box 100, and may be aligned with one another in the width (W) direction. The third cable retainer 120 is spaced further away from the cable plane divider 112 in the width (W) direction than the first and second cable retainers 116, 118. The third cable retainer 120 may be arranged between the first and second cable retainers 116, 118 in the height (H) direction.

Figure 2B:
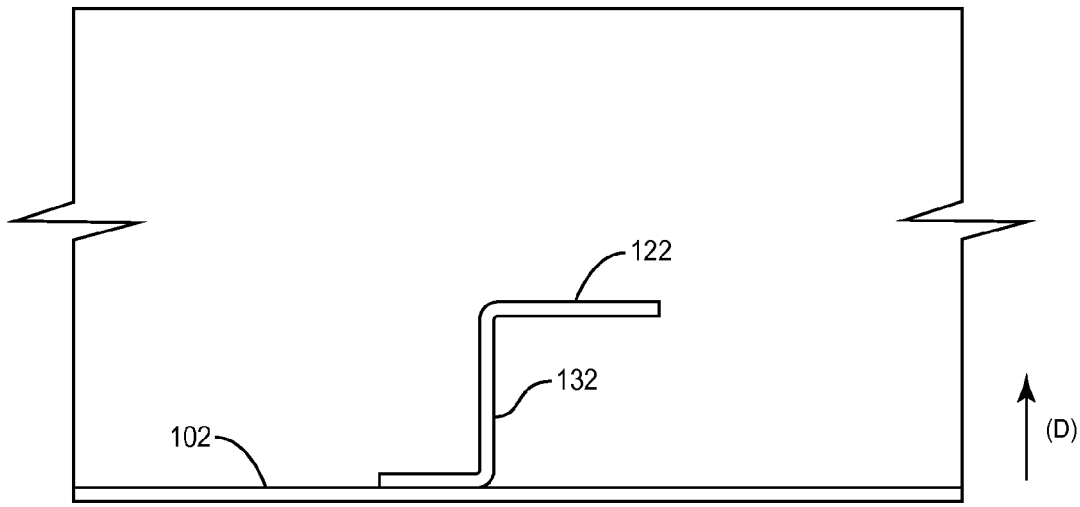

An exemplary side-profile of any one of the first, second and third cable retainers 116, 118 and 120 is depicted in FIG. 2B. The cable retainers 116, 118 and 120 include third and fourth planar sections 122, 132 that extend along different planes and form an angled connection with one another. The third planar section 122 is spaced apart from the rear panel 102 in the depth (D) direction and may extend parallel to the rear panel 102 in the length and width (W) directions, for example. Alternatively, the third planar section 122 may be inclined with respect to the rear panel 102 in one or both of the height (H) and width (W) directions. The fourth planar section 132 extends between the rear panel 102 and the third planar section 122. The cable retainers 116, 118 and 120 are affixed to the rear panel 102 by the fourth planar section 132. The fourth planar section 132 may be perpendicular to the rear panel 102 such that it extends exclusively in the depth (D) direction. Alternatively, the fourth planar section 132 may extend in the length or width (W) directions in addition to the depth (D) direction.

The cable retainers 116, 118 and 120 are configured to constrain fiber optic cabling against the rear panel 102 such that movement of the fiber optic cabling is restricted in the depth (D) direction as well as the length (L) and width (W) directions. For example, the third and fourth planar sections 122, 132 as depicted in FIG. 2 provide opposing planes that resist the movement of fiber optic cabling in all three of these directions. The geometry of the third and fourth planar sections 122, 132 may vary from what is depicted in FIG. 2B. For example, the cable retainers 116, 118 and 120 may include a curved or hook-like structure. The third and fourth planar sections 122, 132 may have different geometries as between different ones of the cable retainers 116, 118 and 120. Further, as exemplified by the third cable retainer 120 depicted in FIG. 1, a further planar surface 123 that is spaced apart from the rear panel 102 and is offset from the third planar surface 122 if the depth direction may be provided. In this configuration, fiber optic cabling can be placed between and constrained by both of the planar surfaces 122, 123.

Figure 3:
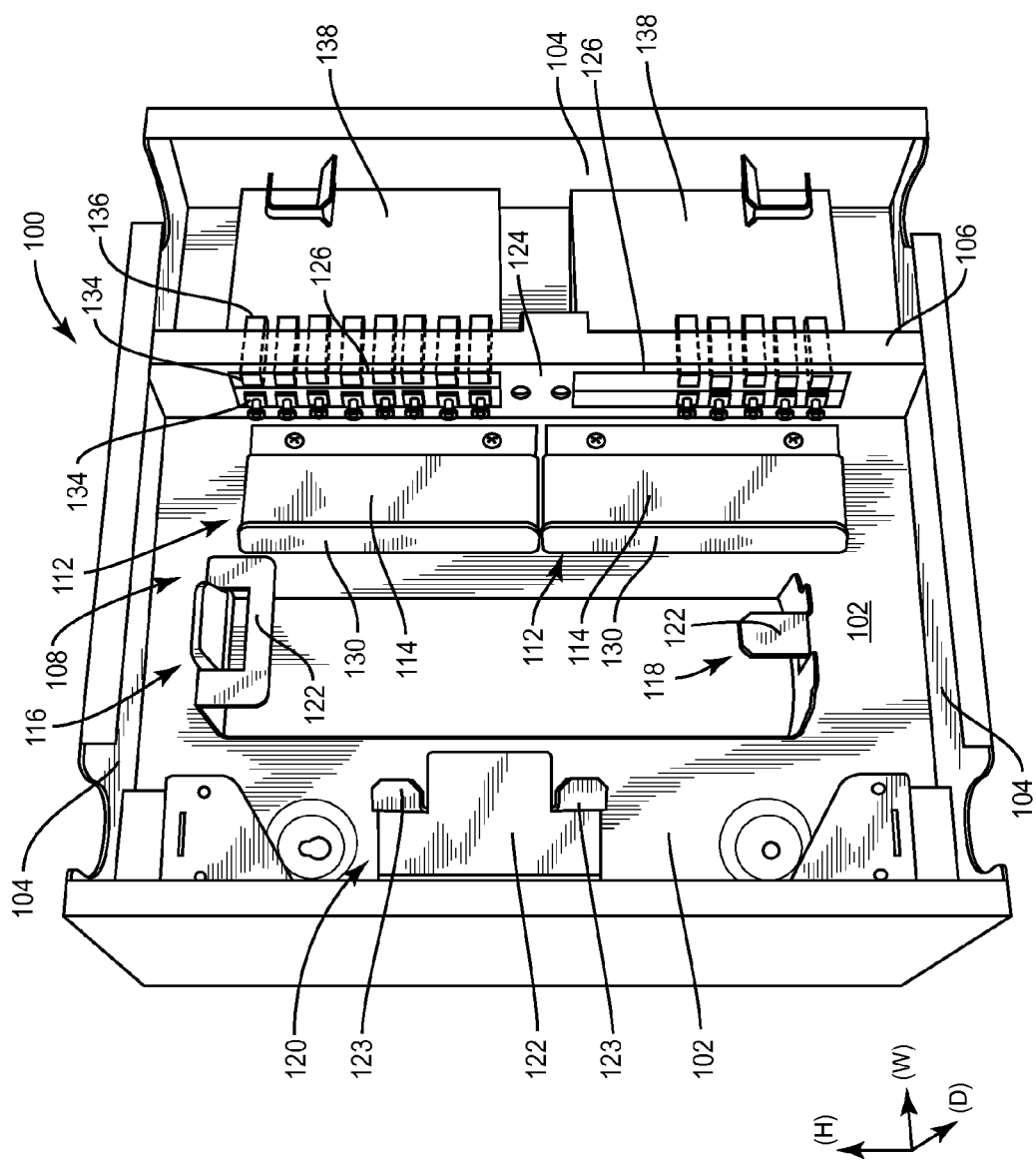
FIG. 3 depicts a fiber demarcation box with pigtail cable receptacles arranged in the bulkhead of the fiber demarcation box, from diagonal-view perspective, according to an embodiment.

Referring to FIG. 3, a diagonal-view of the fiber demarcation box 100 with a plurality of pigtail cable receptacles 134 is depicted. The pigtail cable receptacles 134 are arranged in the bulkhead 106 and spaced apart from the rear panel 102 in the depth (D) direction. Each of the receptacles 134 is dimensioned complementary to an endpoint structure of fiber optic cabling, such as pigtail cabling, such that the endpoint structure can be coupled with the pigtail cable receptacles 134. For example, the receptacles 134 may be compatible with any optical connector format, such as LC, SC, FC, etc., so as to receive the endpoint structure of the fiber optic cabling in an interlocking manner.

According to an embodiment, the pigtail cable receptacles 134 are provided by an array of end connectors 136 and a fiber optic cassette 138 arranged in the opening 126 of the bulkhead 106. The end connectors 136 are discrete structures that are inserted in the opening 126 and each provide a single pigtail cable receptacle 134. The fiber optic cassette 138 is also inserted in the opening 126 and provides a plurality of the pigtail cable receptacles 134. The fiber optic cassette 138 may be any commercially available fiber optic cassette 138, such as a CWDM HiD4 cassette, which is manufactured by All Systems Broadband®. According to an embodiment, the array of end connectors 136 is stacked on top of the fiber optic cassette 138 in the depth (D) direction. Alternatively, the fiber demarcation box 100 may be configured with two or more arrays of end connectors 136 stacked on top of one another in the depth (D) direction.

The first planar section 114 of the cable plane divider 112 is arranged between the pigtail cable receptacles 134 and the rear panel 102 in the depth (D) direction. For example, in the embodiment of FIG. 3, the first planar section 114 is arranged beneath the fiber optic cassette 138 in the depth (D) direction.

Figure 4:
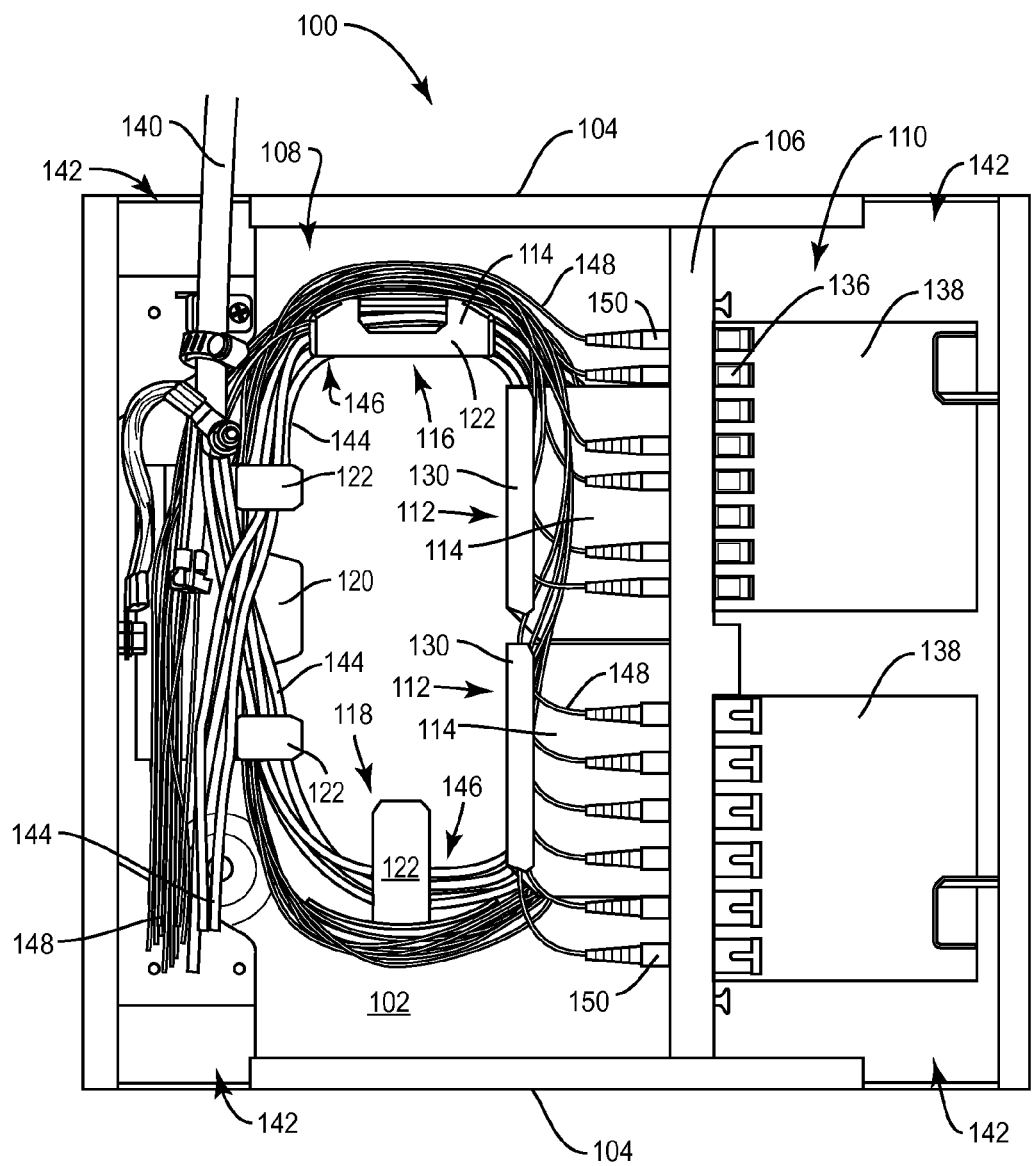
FIG. 4 depicts a fiber demarcation box with a coil of loose-buffer-tube fiber optic cables being constrained by a cable plane divider and cable retainers and a plurality of tight-buffer fiber optic cables inserted in the pigtail cable receptacles and separated from the coil of loose-buffer-tube fiber optic cables by the cable plane divider, according to an embodiment.

Referring to FIG. 4, fiber optic cables have been routed into the fiber demarcation box 100. Service provider cabling 140 is routed into the fiber demarcation box 100 at ports 142 that are located at corners of the fiber demarcation box 100. A cable jacket of the service provider cabling 140 is stripped such that loose-buffer-tube fiber optic cables 144 are exposed from the cable jacket within the fiber demarcation box 100.

According to an embodiment, the loose-buffer-tube fiber optic cables 144 are coiled and placed in the first interior volume 108. This coil 146 is constrained between the rear panel 102 and the cable plane divider 112 by the first planar section 114 of the cable divider. Thus, the coil 146 is relegated to a portion of the fiber demarcation box 100 that is beneath the first planar section 114 in the depth (D) direction. The coil 146 of loose-buffer-tube fiber optic cables 144 may also be constrained in the depth (D) direction by each of the cable retainers 116, 118 and 120 in the plurality. For example, as shown in FIG. 4, the first planar section 114 of the cable plane divider 112 and each of the third planar sections 122 of the cable retainers 116, 118 and 120 extend over different portions of the coil 146 and therefore provide multi-point retention of the coil 146 of loose-buffer-tube fiber optic cables 144 in the depth (D) direction. Thus, the coil 146 of loose-buffer-tube fiber optic cables 144 is constrained between the rear panel 102 and the third planar sections 122 of the cable retainers 116, 118 and 120. Depending on the configuration of the cable retainers 116, 118 and 120 and the size of the coil 146, the coil may be flush against the rear panel 102.

According to an embodiment, the coil 146 of loose-buffer-tube fiber optic cables 144 is arranged inside of a polygon formed by the cable retainers 116, 118 and 120 such that the coil 146 is constrained in a direction parallel to the rear panel 102 (i.e., the height (H) and width (W) directions). For example, in the configuration of FIG. 4, the fourth planar sections 132 of the first and second cable 116, 118 retainers prevent the loose-buffer-tube fiber optic cables 144 in the coil 146 from moving past the first and second cable retainers 116, 118 in the height (H) direction. Further, the fourth planar section 132 of the third cable retainer 120 prevents the loose-buffer-tube fiber optic cables 144 in the coil 146 from moving past the third cable retainer 120 in the width (W) direction. The cable plane divider 112 can be configured restrict the movement of the coil 146 in the width (W) direction as well. For example, if the first planar section 114 of the cable plane divider 112 is inclined relative to the rear panel 102 in the with (W) direction, the first planar section 114 prevents the loose-buffer-tube fiber optic cables 144 in the coil 146 from moving in the width (W) direction towards the bulkhead 106. Further, the cable plane divider 112 can include a further planar surface extending between the rear panel 102 and the first planar section 114 that prohibits movement of the coil 146 in the width (W) direction.

Because the coil 146 is constrained in the depth (D) direction as well as in the height (H) and width (W) directions, the coil 146 is securely affixed within a defined portion of the fiber demarcation box 100, and the loose-buffer-tube fiber optic cables 144 are not susceptible to movement (e.g., from uncoiling). The dimensions of the features, such as the spacing between the first planar section 114 and the rear panel 102 in the depth (D) direction, or the spacing between the cable retainers 116, 118 and 120 (relative to one another) in the height (H) and width (W) directions, may be tailored to accommodate specific lengths of loose-buffer-tube fiber optic cables 144.

According to an embodiment, a plurality of tight-buffer fiber optic cables 148, e.g., so-called "pigtail" cables, are provided in the fiber demarcation box 100 in addition to the loose-buffer-tube fiber optic cables 144. End connectors 150 of the tight-buffer fiber optic cable are coupled to the pigtail cable receptacles 134 (e.g., by mating end connectors 150 with the pigtail cable receptacles 134 in an interlocking manner) such that the tight-buffer fiber optic cables 148 are securely fastened to the optical cable receptacles 134, and consequently to the bulkhead 106. The tight-buffer fiber optic cables 148 extend away from the optical cable receptacles 134 into the first interior volume 108 in the width (W) direction. Because the first planar section 114 of the cable plane divider 112 is spaced between the rear panel 102 and the pigtail cable receptacles 134 in the depth (D) direction, the cable plane divider 112 separates the tight-buffer fiber optic cables 148 from the coil 146 of loose-buffer-tube fiber optic cables 144 in the depth (D) direction. That is, an inner surface of the first planar section 114 of the cable plane divider 112 that faces the rear panel 102 is in contact with the loose-buffer-tube fiber optic cables 144. An outer surface of the first planar section 114 of the cable plane divider 112 that is opposite from the inner surface is in contact with the tight-buffer fiber optic cables 148. Thus, tight-buffer fiber optic cables 148 overlap with the coil 146 of loose-buffer-tube fiber optic cables 144 in the height (H) and width (W) directions, and are separated from one another in the depth (D) direction by the first planar section 114 of the cable plane divider 112.

According to an embodiment, the tight-buffer fiber optic cables 148 are coiled around the cable retainers 116, 118 and 120. For example, the tight-buffer fiber optic cables 148 may extend away from the pigtail cable receptacles 134 and around outer surfaces of the fourth planar sections 132 of each cable retainer 116, 118 and 120, wherein these outer surfaces are opposite from the inner surfaces of the fourth planar sections 132 that contact the coil 146 of loose-buffertube fiber optic cables 144. In other words, the fourth planar sections 132 separate the tight-buffer fiber optic cables 148 from the loose-buffer-tube fiber optic cables 144 in the height (H) and width (W) directions.

In the assembly of FIG. 4, the tight-buffer fiber optic cables 148 are constrained in the width (W) direction by the second planar section 130 of the cable plane divider 112. The second planar section 130 ensures that the tight-buffer fiber optic cables 148 do not comingle with (i.e., come in contact with) the loose-buffer-tube fiber optic cables 144 in the vicinity of the cable plane divider 112. Thus, forces exerted upon the loose-buffer-tube fiber optic cables 144 are not exerted upon the tight-buffer fiber optic cables 148 in the vicinity of the cable plane divider 112 and therefore do not pose a mechanical risk to the connections between the tight-buffer fiber optic cables 148 and the pigtail cable receptacles 134. Furthermore, the second planar section 130 allows for an organized routing of the tight-buffer fiber optic cables 148 around the cable retainers 116, 118 and 120. The second planar section 130 of the cable plane divider 112 can be spaced apart from the bulkhead 106 by a sufficient distance in the width (W) direction to allow the tight-buffer fiber optic cables 148 to gently bend towards the first cable retainer 116. In other words, there is enough leeway in the width (W) direction between the second planar section 130 and the bulkhead 106 to constrain the tight-buffer fiber optic cables 148 in the width (W) direction without placing an unacceptable amount of pressure on the tight-buffer fiber optic cables 148.

After the tight-buffer fiber optic cables 148 and the loose-buffer-tube fiber optic cables 144 are arranged in the manner described above, these cables may be spliced together. This splicing may be done according to conventionally known techniques, for example. As a result, a fiber optic connection between the service provider cabling 140 and the pigtail cable receptacles 134 can be completed.

Figure 5:
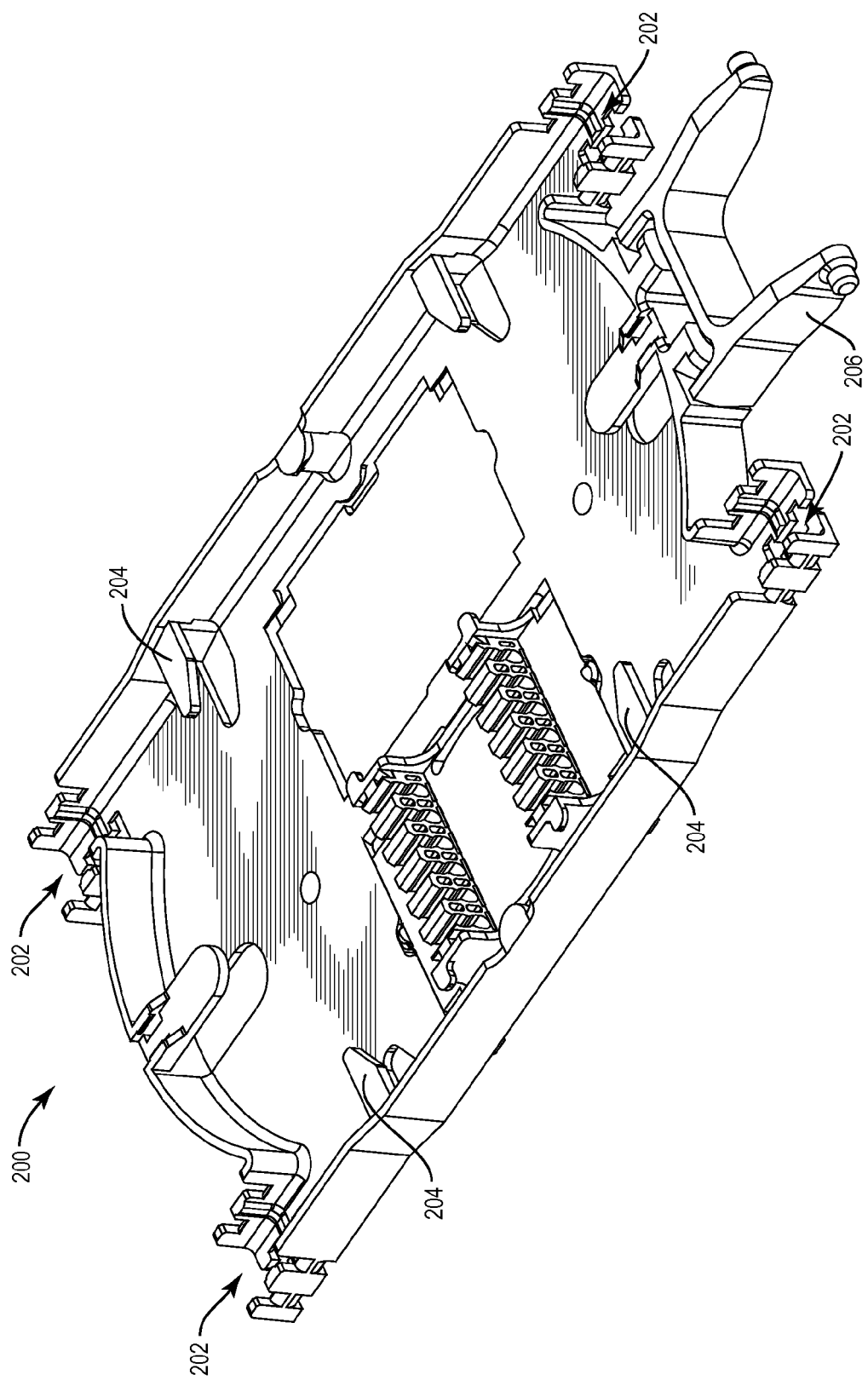
FIG. 5 depicts a fiber tray that is configured to secure and retain a splice between the loose-buffer-tube fiber optic cables and the tight-buffer fiber optic cables, according to an embodiment.

FIG. 5 depicts an exemplary fiber tray 200 that may be used to accommodate a splice between the loose-buffer-tube fiber optic cables 144 and the tight-buffer fiber optic cables 148. The fiber tray 200 includes two or more ports 202 that the loose-buffer-tube fiber optic cables 144 and the tight-buffer fiber optic cables 148 may be fed into. These cables may be coiled and retained by retaining features 204 of the fiber tray 200. According to an embodiment, the fiber tray 200 is the MODULAR ASSEMBLY FOR SUPPORTING FIBER OPTIC SPLICES, as disclosed in U.S. Pat. No. 8,559,784 to Ray, the content of which is incorporated in reference by its entirety.

Figure 6:
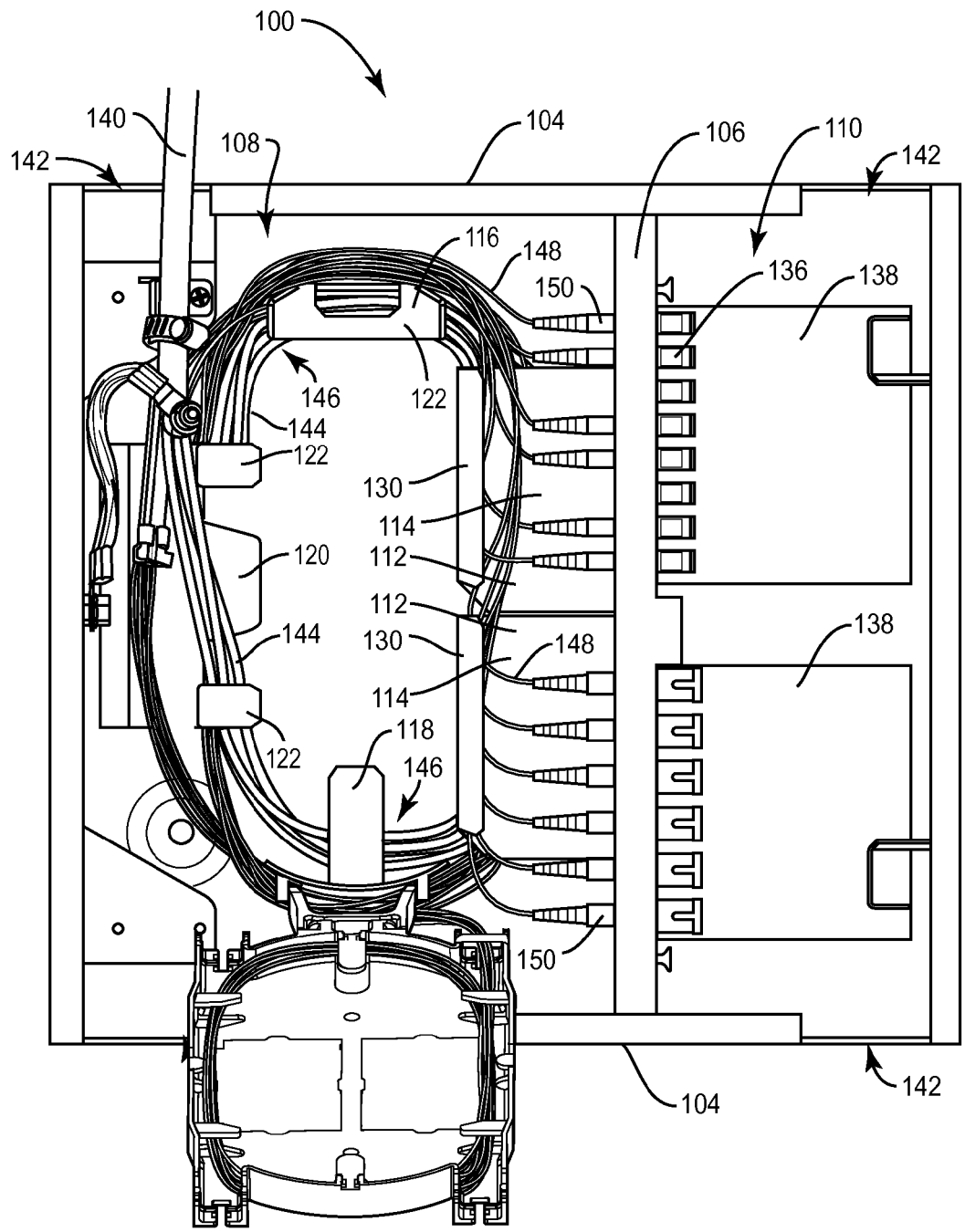
FIG. 6 depicts a fiber demarcation box with a coil of loose-buffer-tube fiber optic cables and the tight-buffer fiber optic cables spliced together and arranged in the fiber tray of FIG. 5, according to an embodiment.

Referring to FIG. 6, the fiber tray 200 of FIG. 5 is affixed to the second cable retainer. The tight-buffer fiber optic cables 148 and the loose-buffer-tube fiber optic cables 144 feed into the fiber tray 200 and are spliced together in the fiber tray 200. According to an embodiment, the fiber tray 200 is affixed to the second cable retainer by a hinge 206. The hinge 206 is configured to pivot around an axis in a conventionally known manner. Thus, the hinge 206 allows the fiber tray 200 to pivot into and out of the first interior volume 108. FIG. 5 depicts a first position of the hinge 206 in which the fiber tray 200 is substantially perpendicular to the rear panel 102 and is thus readily accessible to an installer. As depicted in FIG. 6, a length fiber optic cabling that includes the splice between the loose-buffer-tube fiber optic cables 144 and the tight-buffer fiber optic cables 148 has been coiled and arranged within the retaining features 204 of the fiber tray 200.

Figure 7:
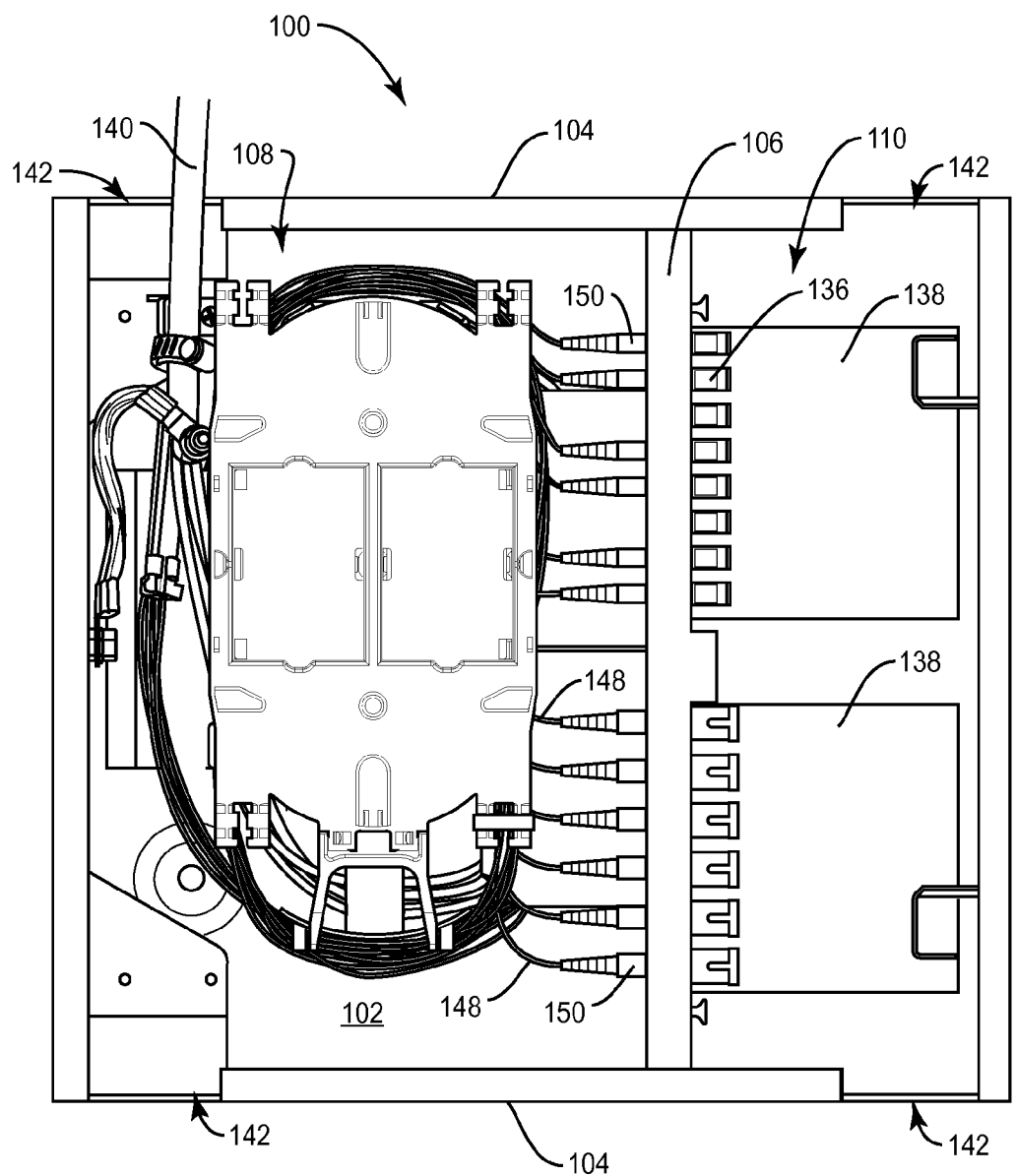
FIG. 7 depicts the fiber demarcation box of FIG. 6 with the fiber tray pivoted around a hinge such that the fiber tray, the coil of loose-buffer-tube fiber optic cables and the tight-buffer fiber optic cables overlap with one another, according to an embodiment.

Referring to FIG. 7, the fiber tray 200 has been pivoted to a second position such that the fiber tray 200 overlaps with the coil 146 of loose-buffer tube fiber optic cabling and the cable plane divider 112 in the width (W) and height (H) directions. Accordingly, the fiber tray 200 safely secures the splice of fiber optic cables while efficiently organizing the fiber optic cables in a space saving manner. This is because the coiled tight-buffer fiber optic cables 148, the coiled loose-buffer-tube fiber optic cables 144 and the fiber optic cables in the splice tray all overlap with one another in the height (H) and width (W) directions, and are layered on top of one another in the depth (D) direction.

The fiber demarcation box 100 may be made from any material that is capable of being formed into the features described herein with enough structural integrity to withstand tension from the fiber optic cabling. For example, the fiber demarcation box 100 may be may be formed by punching or pressing sheet-metal, such as aluminum. The cable plane divider 112 and pigtail cable receptacles 134 may also be formed from pressed sheet-metal, such as aluminum, for example.

As used herein, fiber optic cabling is constrained in any one of the one of the directions of the fiber demarcation box 100 (i.e., the height (H), width (W) and depth (D) directions) if the fiber optic cabling is or would be impeded by the features described herein when moved in these directions. For example, the coil 146 of loose-buffer-tube fiber optic cables 144 is constrained by the first planar section 114 of the cable plane divider 112 in the depth (D) direction if the cabling encounters resistance in the depth (D) direction when moved away from the rear panel 102. The cabling does not necessarily need to be in contact with the first planar section 114 to be constrained. Rather, the cabling is constrained if, when moved away from the rear panel 102 exclusively in the depth (D) direction, the cabling will eventually come into contact with and be resisted by the first planar section 114.

The features of the fiber demarcation box 100 described herein can be affixed to one another by fastening mechanisms, such as screws, adhesive, etc. For example, the cable plane divider 112 can be affixed to the rear panel 102 by a pair of screws. Alternatively, elements can be affixed to one another by a continuous connection. For example, the cable plane divider 112 and the rear panel 102 can be integral components of one structure.

As used herein, opposite sides, ends or boundaries of a structure are arranged across the structure such that these sides, ends or boundaries face one another. For example, a rectangle includes two pairs of sides wherein the sides in each pair are opposite to one another.

As used herein, an angled connection refers to an intersection between two planes that are non-parallel to one another. For example, the first and second planar surfaces 114, 130 of the cable plane divider 112 may directly adjoin one another at any angle other than zero or one-hundred eighty degrees to form an angled connection.

As used herein, the term adjacent requires close proximity between two items, but does not necessarily require direct contact. For example, the cable plane divider 112 may be directly attached to the bulkhead 106 or alternatively may be in close proximity to the bulkhead 106. In either case, the cable plane divider 112 is adjacent to the bulkhead 106. In the case that the cable plane divider 112 is not directly attached to the bulkhead 106, there must be close enough proximity such that the cable plane divider 112 is closer to the bulkhead 106 than the cable retainers 116, 118, 120.

Directional terminology, such as "top," "bottom," "front," "back," "upper," "lower," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An assembly for storing a plurality of spliced fiber optic cables, the assembly comprising:
   a fiber demarcation box, comprising:
   a rear panel;
   outer sidewalls extending away from a perimeter of the rear panel in a depth direction of the fiber demarcation box, the depth direction being perpendicular to the rear panel;
   a bulkhead extending between opposite facing ones of the outer sidewalk and away from the rear panel in the depth direction so as to divide the fiber demarcation box into first and second interior volumes; and
   a cable plane divider in the first interior volume adjacent to the bulkhead and comprising a first planar section extending away from the bulkhead in a direction parallel to the rear panel;
   a plurality of pigtail cable receptacles arranged in the bulkhead such that the first planar section of the cable plane divider is between the pigtail cable receptacles and the rear panel in the depth direction, each of the pigtail cable receptacles being dimensioned to receive an end connector of a fiber optic cable;
   a coil of loose-buffer-tube fiber optic cables in the first interior volume being constrained between the rear panel and the first planar section of the cable plane divider; and
   a plurality of tight-buffer fiber optic cables in the first interior volume positioned above the coil of loose-buffer-tube fiber optic cables with respect to the rear panel, and having end connectors coupled to the pigtail cable receptacles,
      wherein the cable plane divider separates the tight-buffer fiber optic cables from the coil of loose-buffer-tube fiber optic cables in the depth direction.

2. The assembly of claim 1, wherein the fiber demarcation box further comprises a plurality of cable retainers arranged in the first interior volume and affixed to the rear panel, wherein the coil of loose-buffer-tube fiber optic cables is constrained in the depth direction by each of the cable retainers in the plurality.

3. The assembly of claim 2, wherein each of the cable retainers comprise third planar sections that are spaced apart from the rear panel, and wherein the coil of loose-buffer-tube fiber optic cables is constrained between the rear panel and the third planar sections of each of the cable retainers.

4. The assembly of claim 3, wherein each of the cable retainers comprise fourth planar sections extending between the rear panel and the third planar sections of the cable retainers, and wherein the coil of loose-buffer-tube fiber optic cables is arranged inside of a. polygon formed by the cable retainers such that the coil of loose-buffer-tube fiber optic cables is constrained by the fourth planar sections of each cable retainer in a direction parallel to the rear panel.

5. The assembly of claim 4, wherein the cable plane divider comprises a second planar section forming an angled connection with an end of the first planar section that is opposite to the bulkhead, wherein the tight-buffer fiber optic cables are constrained by the second planar section of the cable plane divider in a direction parallel to the rear panel, and wherein the tight-buffer fiber optic cables are coiled around the fourth planar sections of the cable retainers.

6. The assembly of claim 5, further comprising:
   a fiber tray that is affixed to one of the cable retainers and comprises a hinge, the hinge being configured to allow the fiber tray to pivot into the first interior volume so as to overlap with the coil of loose-buffer tube fiber optic cabling and the cable plane divider,
   wherein the tight-buffer fiber optic cables and the loose-buffer-tube fiber optic cables feed into the fiber tray and are spliced together in the fiber tray.

7. The assembly of claim 1 wherein the plurality of pigtail cable receptacles comprises:
   an array of end connectors being arranged in an opening in the bulkhead; and
   a fiber optic cassette arranged in the opening.

8. The assembly of claim 7, wherein the array of end connectors is stacked on top of the fiber optic cassette the depth direction, and wherein the first planar section of the cable plane divider is arranged between the fiber optic cassette and the rear panel in the depth direction.

9. The assembly of claim 1, wherein the coil of loose-buffer-tube fiber optic cables directly contacts an inner surface of the first planar section that faces the rear panel, and wherein the tight-buffer fiber optic cables directly contact an outer surface of the of the first planar section that is opposite from the inner surface.

10. A fiber demarcation box for storing a plurality of spliced fiber optic cables, the fiber demarcation box comprising:
   a rear panel extending along a plane in a height and width direction of the fiber demarcation box, the height and width directions being perpendicular to one another;
   outer sidewalk extending away from a perimeter of the rear panel in a depth direction of the fiber demarcation box, the depth direction being perpendicular to the height and width directions;
   a bulkhead that adjoins the rear panel and the outer sidewalls and extends between opposite facing ones of the outer sidewalls in the height direction so as to divide the fiber demarcation box into first and second interior volumes;
   a cable plane divider in the first interior volume adjacent to the bulkhead comprising a first planar section that extends away from the bulkhead in the width direction and is spaced apart from the rear panel in the depth direction.

11. The fiber demarcation box of claim 10, wherein the cable plane divider further comprises:
a base section affixed to the rear panel or the bulkhead and forming an angled connection with the first planar section; and
a second planar section forming an angled connection with the first planar section at an end of the first planar section that is opposite from the bulkhead.

12. The fiber demarcation box of claim 11, wherein the second planar section extends towards the bulkhead in the width direction.

13. The fiber demarcation box of claim 10, further comprising a plurality of cable retainers arranged in the first interior volume and collectively forming a polygon that is spaced apart from the bulkhead in the width direction.

14. The fiber demarcation box of claim 13, wherein the plurality of cable retainers comprises first, second and third cable retainers, wherein the first and second cable retainers are spaced apart from one another in the height direction, and wherein the third cable retainer is spaced further away from the cable plane divider in the width direction than the first and second cable retainers.

15. The fiber demarcation box of claim 14, wherein each of the cable retainers comprise third and fourth planar sections, the third planar section being spaced apart from the rear panel in the depth direction, the fourth planar section extending between the rear panel and the third planar section, wherein the third planar section is parallel with the rear panel, and wherein the fourth planar section is perpendicular to the rear panel.

16. The fiber demarcation box of claim 10, wherein a section of the rear panel adjacent the bulkhead that is at least one third of a length of the bulkhead is covered by one or more of the cable plane dividers, the length of the bulkhead being measured between the opposite facing ones of the outer sidewalls.

17. A method of storing a plurality of spliced fiber optic cables in a fiber demarcation box, the method comprising:
providing a fiber demarcation box comprising: a rear panel, outer sidewalls extending away from a perimeter of the rear panel, a bulkhead extending between opposite facing ones of the outer sidewalls, and a cable plane divider in the first interior volume adjacent to the bulkhead, the cable plane divider comprising a first planar section extending away from the bulkhead in a direction parallel to the rear panel;
providing a plurality of pigtail cable receptacles in the bulkhead such that the first planar section of the cable plane divider is between the pigtail cable receptacles and the rear panel in the depth direction, each of the pigtail cable receptacles being dimensioned to receive an end connector of a fiber optic cable;
splicing a plurality of loose-buffer-tube fiber optic cables with a plurality of t-buffer fiber optic cables having end connectors;
coiling the loose-buffer tube fiber optic cables;
arranging the coil of loose-buffer tube fiber optic cables in the first interior volume between the first planar section of the cable plane divider and the rear panel;
inserting the end connectors of the tight-buffer fiber optic cables into the pigtail cable receptacles such that the tight-buffer fiber optic cables are positioned above the coil of loose-buffer-tube fiber optic cables with respect to the rear panel, and such that the end connectors of the tight-buffer fiber optic cables are coupled to the pigtail cable receptacles; and
arranging the loose-buffer tube fiber optic cables and the tight-buffer fiber optic cables such that the cable plane divider separates the tight-buffer fiber optic cables from the coil of loose-buffer-tube fiber optic cables in the depth direction.

18. The method of claim 17, wherein the fiber demarcation box further comprises a plurality of cable retainers arranged in the first interior volume and affixed to the rear panel, the method further comprising:
arranging the coil of loose-buffer tube fiber optic cables between the cable retainers and the rear panel.

19. The method of claim 18, further comprising:
affixing a fiber tray comprising a hinge to one of the cable retainers;
coiling a length fiber optic cabling that includes the splice between the loose-buffer-tube fiber optic cables and the tight-buffer fiber optic cables;
arranging the coiled length fiber optic cabling that includes the splice within retaining features of the fiber tray; and
pivoting the fiber tray around the hinge and towards the rear panel such that the fiber tray overlaps with the coil of loose-buffer-tube fiber optic cables and with the cable plane divider.

20. The method of claim 17, wherein the loose-buffer tube fiber optic cables and the tight-buffer fiber optic cables are arranged such that the coil of loose-buffer-tube fiber optic cables directly contacts an inner surface of the first planar section that faces the rear panel and such that the tight-buffer fiber optic cables directly contact an outer surface of the of the first planar section that is opposite from the inner surface.

* * * * *